United States Patent
Müeller et al.

(10) Patent No.: US 11,763,539 B2
(45) Date of Patent: Sep. 19, 2023

(54) SYSTEM AND METHOD FOR DISPLAYING SPATIAL INFORMATION IN THE FIELD OF VIEW OF A DRIVER OF A VEHICLE

(71) Applicant: Aptiv Technologies Limited, St. Michael (BB)

(72) Inventors: Dennis Müeller, Moers (DE); Lutz Roese-Koerner, Remscheid (DE); Christian Prediger, Lindlar (DE); Alexander Barth, Wermelskirchen (DE)

(73) Assignee: Aptiv Technologies Limited, St. Michael (BB)

( * ) Notice: Subject to any disclaimer, the term of this patent is extended or adjusted under 35 U.S.C. 154(b) by 197 days.

(21) Appl. No.: 17/156,357

(22) Filed: Jan. 22, 2021

(65) Prior Publication Data
US 2021/0245767 A1    Aug. 12, 2021

(30) Foreign Application Priority Data
Feb. 12, 2020    (EP) .................................... 20157009

(51) Int. Cl.
*B60W 40/09*    (2012.01)
*G06V 20/58*    (2022.01)
(Continued)

(52) U.S. Cl.
CPC ............ *G06V 10/25* (2022.01); *B60W 30/14* (2013.01); *B60W 40/09* (2013.01);
(Continued)

(58) Field of Classification Search
None
See application file for complete search history.

(56) References Cited

U.S. PATENT DOCUMENTS

| 10,042,170 B2 | 8/2018 | Irzyk |
| 2013/0307771 A1* | 11/2013 | Parker .................... G06F 3/167 |
| | | 345/158 |

(Continued)

FOREIGN PATENT DOCUMENTS

| KR | 20130012629 | 2/2013 |
| WO | 2018017751 | 1/2018 |

OTHER PUBLICATIONS

"Extended European Search Report", EP Application No. 20157009.0, dated Aug. 27, 2020, 8 pages.
(Continued)

*Primary Examiner* — Alan D Hutchinson
*Assistant Examiner* — Andy Schneider
(74) *Attorney, Agent, or Firm* — Sawtooth Patent Group PLLC

(57) ABSTRACT

A method for providing information related to an external object in a field of view of a driver of a vehicle comprises that the driver is monitored by a camera system, and that an estimated eye position is identified based on data provided by the camera system. Spatial information is gathered for at least one external object outside the vehicle. A basic display location is determined for a visual output related to the external object based on the spatial information. At least one imminent or instantaneous disturbance event for the vehicle is detected. An eye position correction and/or a display location correction are determined in response to the imminent or instantaneous disturbance event. The visual output related to the external object is generated based on the estimated eye position and the basic display location and based on the eye position correction and/or the display location correction.

20 Claims, 3 Drawing Sheets

(51) Int. Cl.
*G06V 20/59* (2022.01)
*G06V 40/18* (2022.01)
*G06V 10/82* (2022.01)
*G06V 10/25* (2022.01)
*B60W 30/14* (2006.01)
*G06V 10/764* (2022.01)

(52) U.S. Cl.
CPC ............ *G06V 10/764* (2022.01); *G06V 10/82* (2022.01); *G06V 20/58* (2022.01); *G06V 20/597* (2022.01); *G06V 40/18* (2022.01); *B60W 2540/229* (2020.02)

(56) References Cited

U.S. PATENT DOCUMENTS

| | | |
|---|---|---|
| 2015/0293585 A1 | 10/2015 | Seok et al. |
| 2016/0025973 A1 | 1/2016 | Guttag et al. |
| 2016/0163108 A1 | 6/2016 | Kim |
| 2019/0265703 A1* | 8/2019 | Hicok .................. G05D 1/0242 |

OTHER PUBLICATIONS

Khan, et al., "Multi-class Semantic Segmentation of Faces", Aug. 2015, 5 pages.

Tasaki, et al., "Depth Perception Control During Car Vibration by Hidden Images on Monocular Head-Up Display", Dec. 2013, pp. 2850-2856.

Ziraknejad, et al., "The eflect of Time-of-Flight camera integration time on vehicle driver head pose tracking accuracy", Jul. 2012, 8 pages.

* cited by examiner

SYSTEM AND METHOD FOR DISPLAYING SPATIAL INFORMATION IN THE FIELD OF VIEW OF A DRIVER OF A VEHICLE

CROSS-REFERENCE TO RELATED APPLICATION(S)

This application claims priority to European Patent Application Number 20157009.0, filed Feb. 12, 2020, the disclosure of which is hereby incorporated by reference in its entirety herein.

TECHNICAL FIELD

The present disclosure relates to a computer implemented method and a system for providing information related to an external object in the field of view of a driver of a vehicle via a head-up display (HUD).

BACKGROUND

Modern vehicles like passenger cars may be equipped with a so-called head-up display (HUD) which displays information being relevant for a driver of the vehicle directly in the field of view of the driver, e.g. on a windshield of the vehicle. This information may comprise speed limits or instructions from a navigation system installed in the vehicle.

In addition, modern vehicles may also be equipped with devices for detecting or exploring the environment of the vehicle. Such devices may belong to an advanced driver assistance system (ADAS) which may comprise, for example, an adaptive cruise control (ACC) and a lane keeping assistance (LKA) and further devices like camera systems and/or radar or LIDAR systems for detecting objects like pedestrians or other vehicles in the environment of the vehicle.

Advanced head-up display systems may also be able to display spatial information or meta information related to objects in the environment of the vehicle. This may comprise highlighting an approaching pedestrian or highlighting a lane to be taken by the vehicle. The meta information may comprise advertisements or opening hours, for example, of facilities detected in the surrounding. The visual output provided for the head-up display which is necessary for correctly displaying the spatial or meta information related to an object depends on at least three parameters, i.e. the spatial position of the object itself, the spatial position of the eyes of the driver, and the spatial position of the windshield of the vehicle. Therefore, the visual output required for displaying the object information may be deteriorated by sudden and unintended events during driving, e.g. by vibrations of the vehicle or road bumps. Such events may lead to an unstable visual appearance of the information related to the object on the head-up display.

Accordingly, there is a need for a system and a method providing a visual output related to an external object being located outside a vehicle at the correct position and in a stable way on a head-up display of a vehicle.

SUMMARY

The present disclosure provides a computer implemented method, a system, a computer system and a non-transitory computer readable medium according to the independent claims. Embodiments are given in the subclaims, the description and the drawings.

In one aspect, the present disclosure is directed at a computer implemented method for providing information related to an external object in a field of view of a driver of a vehicle. The method comprises monitoring the driver by a camera system within the vehicle, identifying, by means of a driver modeling module, an estimated eye position of the driver with respect to a vehicle coordinate system based on data provided by the camera system, gathering spatial information of at least one external object being located outside the vehicle by means of an object detection module, determining a basic display location for a visual output related to the external object based on the spatial information by using the object detection module, detecting at least one imminent or instantaneous disturbance event regarding movement of the vehicle by means of a correction module, determining, by using the correction module, an eye position correction based on the estimated eye position and/or a display location correction based on the basic display location in response to the imminent or instantaneous disturbance event in order to compensate an unintended movement of the vehicle, and generating the visual output related to the external object based on the estimated eye position and the basic display location and based on the eye position correction and/or the display location correction by means of a display module.

The term "eye position of the driver" may be defined as a center position of a connection line between the respective positions of the right eye and the left eye of the driver. That is, the positions of the right eye and the left eye of the driver may be determined first, e.g. by identifying the center positions of the respective pupils of the driver, and then the center position of the connection line between the positions of the right and left pupils may be estimated as the "estimated eye position".

In addition, a gaze direction of the driver may be defined as a direction perpendicular to the connection line between the positions of the eyes of the driver and oriented to the external object for which the information is to be provided. That is, the gaze direction regarding the external object is given by the estimated eye position of the driver and by the spatial information for the external object.

Moreover, the vehicle coordinate system may be a three-dimensional coordinate system having a center at a position of the camera system. That is, a calibrated camera system, i.e. having a calibrated position and alignment with respect to the vehicle, may be assumed for the method according to the disclosure. Therefore, the coordinates of a windshield of the vehicle may also be assumed to be known with respect to the position of the camera system.

An imminent disturbance event for the vehicle may comprise road bumps in front of the vehicle, for example. A further camera directed at the road in front of the vehicle may recognize e.g. potholes which might disturb the movement of the vehicle in the near future. The instantaneous disturbance events may comprise vibrations or jerks of the vehicle. The vibrations may be caused by the vehicle itself, e.g. at a certain rotational speed of the engine, whereas a jerk may be caused by an external impact, e.g. by a change in wind force or wind direction. All imminent or instantaneous disturbance events may cause a sudden change in the translation coordinates of the vehicle, e.g. in x-, y- and/or z-direction, as well as in the rotational angles, e.g. in yaw, pitch and/or roll angles.

The visual output related to the external object may be made visible by a head-up display (HUD) on a windshield of the vehicle. The method according to the disclosure corrects the visual output provided e.g. for the head-up display for the effect due to the imminent or instantaneous disturbance events by either correcting the estimated eye position or the basic display location, or both. Due to this correction, the distance and the direction of a connection line between the eye position and the display location, e.g. on the windshield of the vehicle, are kept invariant during the disturbance event. As a consequence, the visual output related to the external object is stabilized in spite of the disturbance events. Therefore, the visual output may be further displayed at the correct position on the windshield of the vehicle even during a disturbance event.

The external object may be a pedestrian or another vehicle, for example, which may interfere with the movement of the vehicle under consideration. Hence, the safety when driving may be improved by the method according to the disclosure since the external object may be highlighted for example in order to draw attention of the driver to a possible danger in front or at the side of the vehicle.

In summary, the method according to the disclosure provides a "fast response asperity correction" for the visual output related to the external object in order to provide e.g. a stable highlighting of the external object although a disturbance event might take place. In addition, the information related to the external object may also comprise meta information like opening times or an advertisement for some facility close to the road on which the vehicle is moving.

The method may comprise one or more of the following features:

The at least one imminent or instantaneous disturbance event may be detected by measuring vibrations and/or jerks of the vehicle via a gyro sensor and an accelerometer. The at least one imminent or instantaneous disturbance event may be detected by the correction module i) monitoring a road in front of the vehicle, ii) estimating a ground level based on data provided by monitoring the road, and iii) determining a deviation from the estimated ground level for the road in front of the vehicle.

Furthermore, identifying the estimated eye position of the driver by using the correction module may further comprise determining a face spatial location and a body spatial location of the driver with respect to the vehicle coordinate system based on data provided by the camera system, and determining and/or validating the estimated eye position based on the face spatial location and the body spatial location. In addition, identifying an estimated eye position of the driver may further comprise predicting the estimated eye position based on the face spatial location and the body spatial location for a predetermined time period. Moreover, gathering the spatial information of the external object may comprise the object detection module extracting data from three-dimensional maps provided by a navigation system of the vehicle.

According to an embodiment, the at least one imminent or instantaneous disturbance event may be detected by measuring vibrations and/or jerks of the vehicle via a gyro sensor and an accelerometer. Alternatively or additionally, the at least one imminent or instantaneous disturbance event may be detected by the correction module monitoring a road in front of the vehicle, estimating a ground level based on data provided by monitoring the road, and determining a deviation from the estimated ground level for the road in front of the vehicle.

The road in front of the vehicle may be monitored by using a stereo camera system and/or a LIDAR sensor. The gyro sensor, the accelerometer, the stereo camera system and the LIDAR may be already installed in the vehicle, e.g. as part of an advanced driver assistance system (ADAS). Therefore, the method according to the disclosure may be implemented in a vehicle at reduced costs for this embodiment since data from sensors may be used which are already available in the vehicle. In addition, the stability of the visual output which is to be displayed on the head-up display may be further improved by detecting both, i.e. imminent and instantaneous disturbance events, by using the gyro sensor, the accelerometer, and one of the stereo camera system and the LIDAR system for detecting vibrations and jerks as well as deviations from the estimated ground level for the road in front of the vehicle.

The step of identifying an estimated eye position of the driver by using the correction module may further comprise that a face spatial location and a body spatial location of the driver are determined with respect to the vehicle coordinate system based on data provided by the camera system, and that the estimated eye position is determined and/or validated based on the face spatial location the body spatial location.

The face spatial location and the body spatial location may be defined based on key points which are determined via data provided by the camera system, and their connection by lines and/or oriented edges. These points and edges may be used for adapting a driver model in which the eyes, the head and the torso of the driver may be independent movable parts. For example, a rag doll model may be used according to which the head of the driver is modeled by a simple cube for modeling the face as well, and similar simple geometrical shapes are used for modeling the torso and the eyes.

Since the estimated eye position may be determined and validated based on the face spatial location and the body spatial location in addition to a direct monitoring of the eye position, the accuracy of the estimated eye position may be improved due to this redundancy. Furthermore, changes of the estimated eye position may be checked by tracking the eye position over a predetermined time period which may allow examining the reliability of the estimated eye position.

For validating the estimated eye position, it may be examined if the spatial locations e.g. of the torso, the head and the face are in line with the estimated eye position. For example, upper limits may be defined for maximum distances between the estimated eye position and key points for the body or for a rate of change of the relative movement therebetween. In summary, plausibility checks may be performed for the estimated eye position based on the determined body spatial location.

Furthermore, the step of identifying an estimated eye position of the driver may further comprise that the estimated eye position is predicted based on the face spatial location and the body spatial location of the driver for a predetermined time period. Predicting the estimated eye position may be performed by using neural networks for the data provided by the camera system which monitors the driver taking into account a driver model. Due to the prediction of the estimated eye position, the stability of the visual output, e.g. for a head-up display, may be improved. The prediction of the estimated eye position may be performed for a short time period, e.g. milliseconds, and may be performed by a neural network which may be trained by the movement of the driver.

The step of gathering the spatial information of the external object may comprise the object detection module extracting data from three-dimensional maps provided by a navigation system of the vehicle. The data may comprise information regarding the road on which the vehicle is driving, e.g. the lane to be taken at the next intersection, and the information related to these data may be highlighting the lane to be taken.

Due to the known data from the navigation system, the spatial information regarding a special external object may be known in advance. This may improve the performance and the reliability of the visual output provided e.g. for the head-up display.

In another aspect, the present disclosure is directed at a system for providing information related to an external object in a field of view of a driver of a vehicle. The system comprises a camera system configured to monitor a driver within the vehicle and a driver modeling module configured to identify an estimated eye position of the driver with respect to a vehicle coordinate system based on data provided by the camera system. The system further comprises an object detection module configured to gather spatial information of at least one external object being located outside the vehicle and for determining a basic display location for a visual output related to the external object based on the spatial information. Furthermore, the system comprises a correction module configured to: i) detect at least one imminent or instantaneous disturbance event regarding movement of the vehicle, and ii) determine an eye position correction based on the estimated eye position and/or a display location correction based on the basic display location in response to the imminent or instantaneous disturbance event in order to compensate an unintended movement of the vehicle. In addition, the system comprises a display module configured to generate the visual output related to the external object based on the estimated eye position and the basic display location and based on the eye position correction and/or the display location correction.

In summary, the system according to the disclosure comprises a camera system and four modules for performing the steps as described above for the corresponding method. Therefore, the benefits and advantages as described above for the method are also valid for the system according to the disclosure.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor.

Whereas the driver modeling module is provided for analyzing the data provided by the camera system and the display module is provided for generating a visual output, the object detection module and the correction module are gathering further information regarding the environment of the vehicle and may therefore comprise further cameras and/or sensors. These cameras and sensors may be already installed in the vehicle. Therefore, the system may mostly perform a fusion of data being already available from cameras and sensors which provide data already for other purposes. Hence, the system may be installed at low cost.

The system may comprise one or more of the following features:

The camera system may comprise a time of flight camera and/or a near infrared camera and/or a stereo camera. The correction module may comprise a gyro sensor and an accelerometer for measuring vibrations and/or jerks of the vehicle as instantaneous disturbance events regarding movement of the vehicle. Alternatively or additionally, the correction module may comprise a ground level estimation module configured to monitor a road in front of the vehicle and estimating a ground level based on data provided by monitoring the road, wherein the correction module may be configured to determine an imminent disturbance event regarding movement of the vehicle by determining a deviation from the estimated ground level for the road in front of the vehicle. The ground level estimation module may comprise a stereo camera system and/or a LIDAR system for monitoring the road in front of the vehicle.

Furthermore, the driver modeling module may further comprise i) a face detector for determining a face spatial location of the driver with respect to the vehicle coordinate system based on data provided by the camera system, ii) a body detector for determining a body spatial location of the driver with respect to a vehicle coordinate system based on data provided by the camera system, iii) an eye tracker for determining and tracking the estimated eye position based on the face spatial location, and iv) a validation unit for validating the estimated eye position based on the body spatial location. In addition, the object detection module may comprise at least one component of an advanced driver assistance system of the vehicle configured to identify the spatial information of the external object.

According to an embodiment, the camera system may comprise a time of flight camera and/or a near infrared camera and/or a stereo camera. If the system comprises a time of flight camera, a depth profile e.g. of the face of the driver will be available in addition to information regarding light intensity. The same is valid if the system comprises a stereo camera. If a near infrared camera is comprised by the camera system, the body of the driver may be easily distinguished from other non-living objects in the vehicle.

The correction module may comprise a gyro sensor and an accelerometer for measuring vibrations and/or jerks of the vehicle as instantaneous disturbance events regarding movement of the vehicle. These sensors may each provide information with respect to three axes of a coordinate system, e.g. regarding acceleration in x-, y- and/or z-direction and regarding rotations around these directions. Therefore, any unintended movement of the vehicle may be detected by the gyro sensor and the accelerometer. This improves the reliability of the system and the stability of the visual output provided by the display module.

The correction module may comprise a ground level estimation module which is configured to monitor a road in front of the vehicle and for estimating a ground level based on data provided by monitoring the road. In addition, the correction module may be configured to determine an imminent disturbance event regarding movement of the vehicle by determining a deviation from the estimated ground level for the road in front of the vehicle. Furthermore, the ground level estimation module may comprise a stereo camera system and/or a LIDAR system for monitoring the road in front of the vehicle.

By estimating the ground level based on monitoring the road in front of the vehicle, the ground level estimation model defines a reference for determining a disturbance event which is imminent due to e.g. road bumps like potholes in front of the vehicle. The imminent disturbance event may be recognized if a predefined threshold for the deviation from this estimated ground level is exceeded. In addition, the imminent disturbance event like a road bump or a pothole may also be identified as an external object for which additional information may be provided in that this object may be highlighted on the head-up display. Therefore, driving security may be improved by highlighting an imminent disturbance event or object.

According to a further embodiment, the driver modeling module may further comprise a face detector, a body detector, an eye tracker and a validation unit. The face and body detectors may determine a face spatial location and a body spatial location, respectively, of the driver with respect to the vehicle coordinate system based on data provided by the camera system. The eye tracker may be provided for determining and tracking the estimated eye position based on the face spatial location. Furthermore, the validation unit may validate the estimated eye position based on the body spatial location.

As mentioned above, the face and body spatial locations may be defined by key positions, e.g. for the upper and lower end of the face, the head and the torso, respectively, of the driver. Due to the additional information provided by the face and body spatial locations of the driver, the accuracy and the reliability of the system may be improved. In addition, plausibility checks may be performed, e.g. by defining upper limits for differences between the respective spatial positions.

The object detection module may comprise at least one component of an advanced driver assistance system (ADAS) of the vehicle configured to identify the spatial information of the external object. Examples for such components of the advanced driver assistance system are further camera systems and radar systems. Therefore, additional hardware components may not be required for the object detection module since one or more components of a system may be used which are already available at the vehicle.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
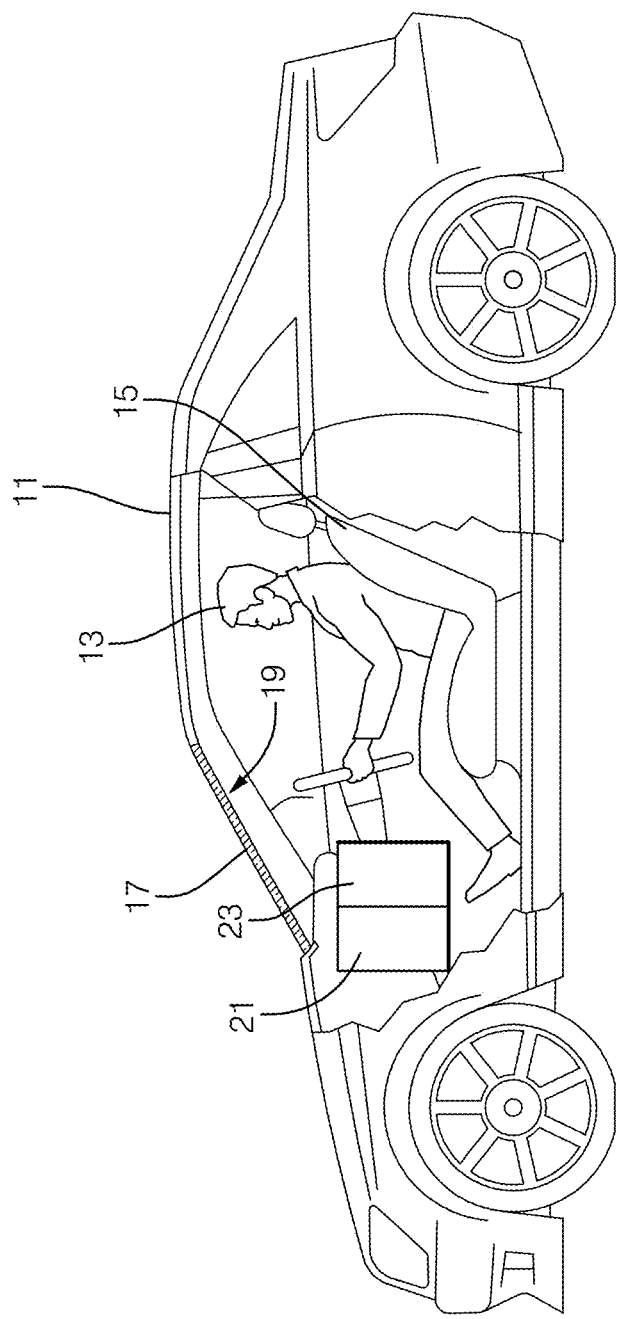
FIG. 1 schematically depicts a vehicle comprising a head-up display on which information regarding an external object is to be displayed, FIG. 2 schematically depicts components of a system according to the disclosure for providing information regarding an external object on the head-up display of the vehicle, and FIG. 3 schematically depicts the performance of the system according to the disclosure when installed within a vehicle.
Figure 1:
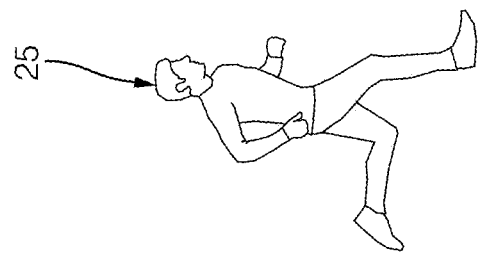

FIG. 1 schematically depicts a vehicle 11 in which a driver 13 is located on a seat 15 and which comprises a windshield 17. The vehicle 11 is further equipped with a head-up display 19 which is provided by a controlling system 21 for providing a visual output at the windshield 17 in the form of the head-up display 19. The visual output may comprise non-spatial information regarding e.g. speed limits and further general information e.g. regarding traffic in the environment of the vehicle 11.

The vehicle 11 is further equipped with an internal camera system 23 which is configured to monitor the driver 13. The internal camera system 23 is a calibrated camera, i.e. the location or position of the internal camera system 23 is known and calibrated with respect to a three-dimensional coordinate system of the vehicle 11. That is, the alignment of the camera system 23 with respect to the driver 13 is also calibrated and predetermined.

Furthermore, the driver 13 of the vehicle 11 has to be aware of objects in the environment of the vehicle 11, e.g. an external object 25 in form of a pedestrian which might interfere with the driving movement of the vehicle 11. Further examples for external objects 25 which might interfere with the movement of the vehicle 11 are road bumps like potholes in front of the vehicle or other vehicles in the environment of the vehicle 11. In order to improve the security for the vehicle 11, it is desirable that further information regarding external objects 25 is shown on the head-up display 19 of the vehicle 11. For example, an external object 25 which might be dangerous or be in danger itself due to the vehicle 11 might be highlighted on the head-up display 19 in order to intensify the attention of the driver 13 regarding the external object 25.

Figure 2:
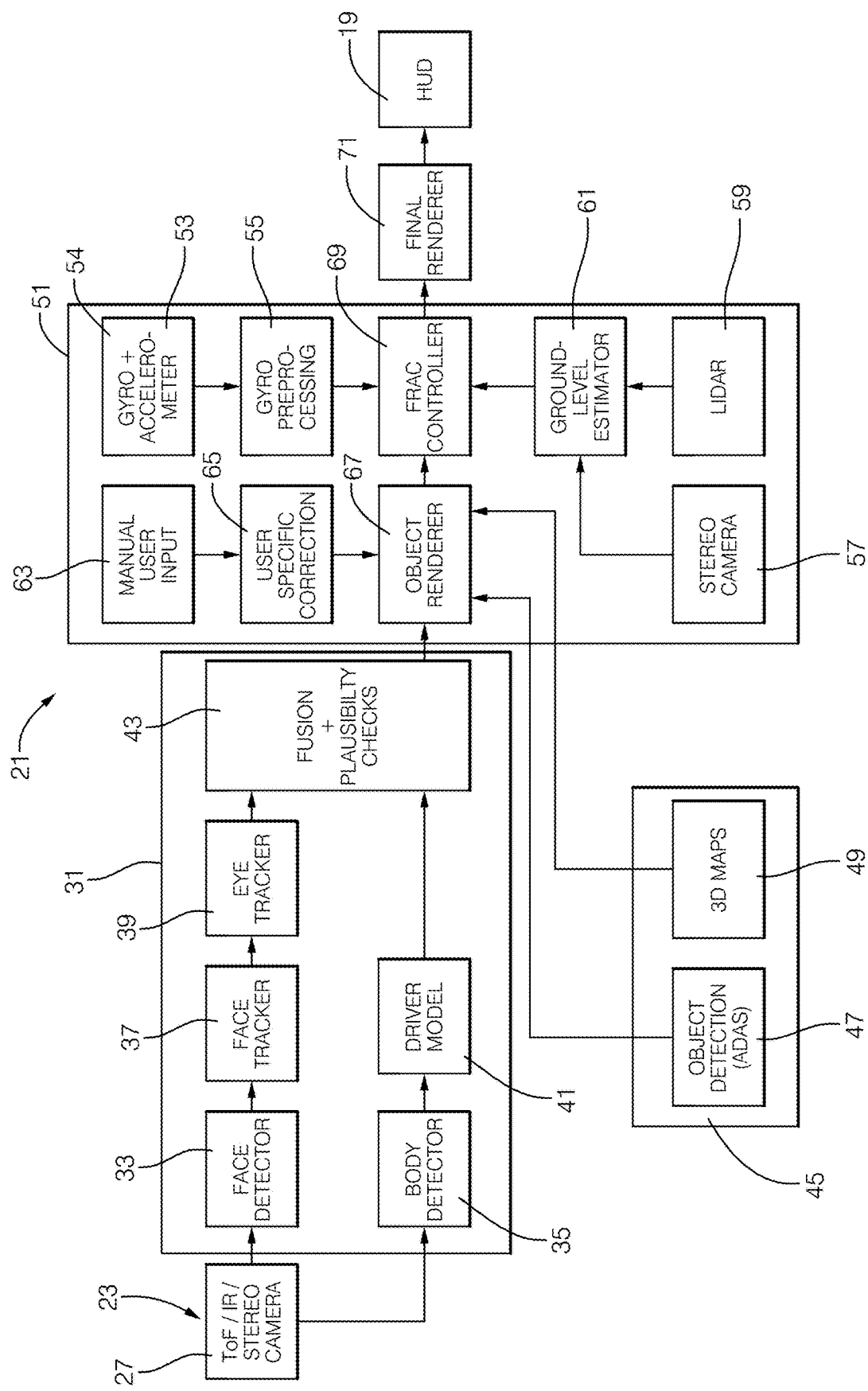

FIG. 2 schematically depicts the components of the system 21 for controlling the head-up display 19 of the vehicle 11 and for providing information related to the external object 25 on the head-up display 19. The internal camera system 23 comprises a time of flight camera 27 which provides information regarding the intensity of light and a depth profile of the monitored object, i.e. the driver 13. The data provided by the internal camera system 23 is available for a driver modeling module 31 which provides an estimated eye position of the driver for the further modules of the system 21. As alternative, the internal camera system 23 may comprise a stereo camera or an infrared camera.

The driver modeling module 31 comprises a face detector 33 and a body detector 35 both of which receive data from the internal camera system 23. The face detector 33 and the body detector 35 are each configured to determine key positions for the face and the body of the driver 13 (see FIG. 1) of the vehicle 11. These key positions each comprise three coordinates, e.g. an x-, y- and z-position, with respect to the three-dimensional coordinate system of the vehicle to which the internal camera system 23 is calibrated.

The key positions determined by the face detector 33 are transferred to a face tracker 37 which determines and tracks the position of a face of the driver 13 within the vehicle 11. The face position is tracked over a predetermined time period. Based on the data provided by the face tracker 37, an eye tracker 39 of the driver modeling module 31 determines an eye position of the driver 13 with respect to the three-dimensional coordinate system of the vehicle. This may be performed by using a model for the face of the driver 13. An estimation of the eye position of the driver based on the model for the face may also comprise a neural network performing a learning procedure based on data received from the internal camera system 23. Due to the tracking of the face of the driver 13 via the face tracker 37, the eye tracker 39 tracks the eye position for the predetermined time period as well.

In detail, positions for the right and left eye of the driver 13 are determined by the eye tracker 39, and a connection line is calculated between the left and right position of the eyes of the driver 13. The center of this connection line between the eyes of the driver 13 is used as the eye position since the gaze or field of view of the driver 13 and a gaze direction are defined perpendicular to the center of the connection line between the eyes of the driver 13. The gaze direction is further determined by the spatial location of the external object 25 which is, for example, to be highlighted on the head-up display 19.

The key positions provided by the body detector 35 for the body of the driver 13 are used as an input for a driver model 41. In detail, simplified geometrical shapes as shown e.g. in FIG. 1 are adapted to the key positions for the head and the torso of the driver 13, wherein the key positions are provided by the body detector 35. In a similar manner, data provided by the face detector 33, i.e. key positions for the face, are provided as input for a driver model regarding the head and the face of the driver 13. By this means, a redundant eye position may be determined for the driver 13, i.e. in addition to the eye position as estimated by the face tracker 37 and the eye tracker 39.

Furthermore, the driver modeling module 31 comprises a fusion and validation module 43 in which the data provided by the eye tracker 39 and the driver model 41 are combined and validated. In detail, the eye position received from the eye tracker 39 is validated by the redundant eye position as determined based on the driver model 41 and is checked for plausibility with respect to the driver model 41 as determined based on the key positions for the body of the driver 13. The fusion and validation module 43 outputs an estimated eye position 73 (see FIG. 3) of the driver 13 with respect to the three-dimensional coordinate system of the vehicle.

In addition, the eye position and the gaze direction of the driver 13 within the vehicle 11 may be predicted using neural networks based on the tracking of the face of the driver 13 via the face tracker 37. That is, the tracking data may be used for the learning of the neural network.

The system 21 further comprises an object detection module 45 which is configured to gather spatial information of at least one external object 25 (see FIG. 1) which is located outside the vehicle 11. The object detection module 45 comprises an object detection device 47 which is a component of an advanced driver assistance system (ADAS) installed in the vehicle 11. The object detection device 47 comprises a further camera and/or a radar system (not shown). In addition, the object detection module 45 comprises three-dimensional maps 49 which are provided e.g. by a navigation system of the vehicle 11. The object detection device 47 and the three-dimensional maps 49 each provide spatial information, i.e. regarding distance and alignment or direction, of external objects 25 outside the vehicle for a correction module 51 comprised by the system 21. The object detection module 45 further determines a categorization of the detected external object 25, i.e. it determines based on the data received by object detection device 47 and/or the three-dimensional maps 49 whether the external object 25 is to be highlighted as e.g. pedestrian, external vehicle, or lane to be taken by the vehicle 11, or whether the external object 25 is a facility for which additional information is to be displayed.

The correction module 51 comprises an accelerometer 53 and a gyro sensor 54 which detect rapid changes regarding the movement of the vehicle, i.e. sudden unintended movements. In detail, the accelerometer measures the acceleration in any of the three directions of the vehicle coordinate system, whereas the gyro sensor determines any rotational movement of the vehicle regarding the vehicle coordinate system, i.e. any change in yaw, pitch and roll angles. The data provided by the accelerometer 53 and the gyro sensor 54 are received by a gyro prepossessing unit 55 which determines if the change in acceleration or rotational movement of the vehicle is relevant for a correction of the display of information related to the external object 25 which is to be provided for the head-up display 19.

The correction module 51 further comprises a stereo camera 57 and/or a LIDAR system 59. The stereo camera 57 and the LIDAR system 59 are used for monitoring the road in front of the vehicle 11 and to provide data for a ground level estimator 61 of the correction module 51. As an alternative, the LIDAR system 59 might be replaced by a radar system.

In addition, the correction module comprises a device 63 for manual user input which allows a user, e.g. the driver 13, of the vehicle to provide a user specific correction 65 for the information regarding the external object 25 which is to be displayed on the head-up display 19. For example, the driver 13 may be able to correct the angle of view at which the information regarding the external object 25 is shown on the windshield 17 via the head-up display 19.

The correction module 51 further comprises an object renderer 67 which receives the estimated eye position 73 from the fusion and validation module 43, i.e. from the driver modeling module 31. In addition, object renderer 67 receives the spatial information regarding the external object 25 from the object detection module 45 and estimates a basic display location 77 based on the spatial information provided by the object detection module 45 and based on the estimated eye position 73. In addition, the object renderer 67 receives data from the object detection module 45 regarding the categorization of the external object 25, i.e. regarding the information related to the external object 25 which is to be displayed on the head-up display 19 at the basic display location 77 as seen by the driver 13.

In addition, the object renderer 67 receives the user specific correction 65 in order to correct the position at which the information related to the object 25 will be displayed on the head-up display 19. The user specific correction 65 is taken into account in order to shift the information for the external object 25 when it is displayed on the windshield 17 of the vehicle 11 (see FIGS. 1 and 3).

Furthermore, the correction module 51 comprises a fast response asperity correction controller (FRAC controller) 69 which receives all relevant information regarding the external object 25 from the object renderer 67, i.e. the estimated eye position 73, the basic display location 77 and the categorization of the external object 25. Furthermore, the FRAC controller 69 receives data from the accelerometer 53 and from the gyro sensor 54 which is preprocessed by the gyro preprocessing module 55 in order to correct the eye position and the gaze direction when instantaneous disturbance events occur at the vehicle.

The FRAC controller 69 also receives data from the ground level estimator 61, from the stereo camera 57 and from the LIDAR system 59. Since the stereo camera 57 and the LIDAR system 59 monitor the road in front of the vehicle 11 and since the ground level estimator 61 estimates a reference level as ground level for the area in front of the vehicle 11, the FRAC controller 69 determines deviations from the ground or reference level determined by the ground level estimator 61 by using the data from the stereo camera 57 and from the LIDAR system 59. By this means, the FRAC controller 69 is able to identify road bumps like potholes in front of the vehicle as imminent disturbance events for the movement of the vehicle 11.

In summary, the FRAC controller 69 recognizes imminent and instantaneous disturbance events for the movement of the vehicle 11 on a short time scale, e.g. within milliseconds, and is therefore able to recognize the effect of these disturbance events on the information which is to be displayed on the head-up display 19. In detail, the FRAC controller 69 is able to counteract the disturbance event by determining an eye position correction and/or a display location correction for the estimated eye position 73 and the basic display location 77, respectively, on the short time scale.

It is noted that a precise display of the spatial information regarding the external object 25 on the windshield 17 of the vehicle 11 depends on three factors, i.e. i) the spatial position of the object to be displayed, ii) the spatial position of the eyes of the driver and its gaze direction, and iii) the spatial position of the windshield. Therefore, the appearance of the information related to the external object 25 may be corrected when displayed on the head-up display 19 at the windshield 17 either by correcting the estimated eye position 73 of the driver or the basic display location 77 on the windshield 17, or both. Due to the correction, the distance and the spatial alignment of the display location on the windshield 17 relative to the eye position of the driver 13 are kept constant in time in spite of disturbance events.

The corrected information relevant for the external object 25, including the corrected display location on the windshield 17 and the corrected eye position of the driver 13, is further transferred from the FRAC controller 69 to a display module or final renderer 71 of the system 21. The display module 71 is configured to generate a visual output related to the external object 25 for the head-up display 19. The visual output is based on the corrected display location for the information related to the external object 25, the corrected eye position of the driver 13 and the categorization of the external object 25. The display module or final renderer 71 controls the head-up display 19 by transferring the visual output.

Figure 3:
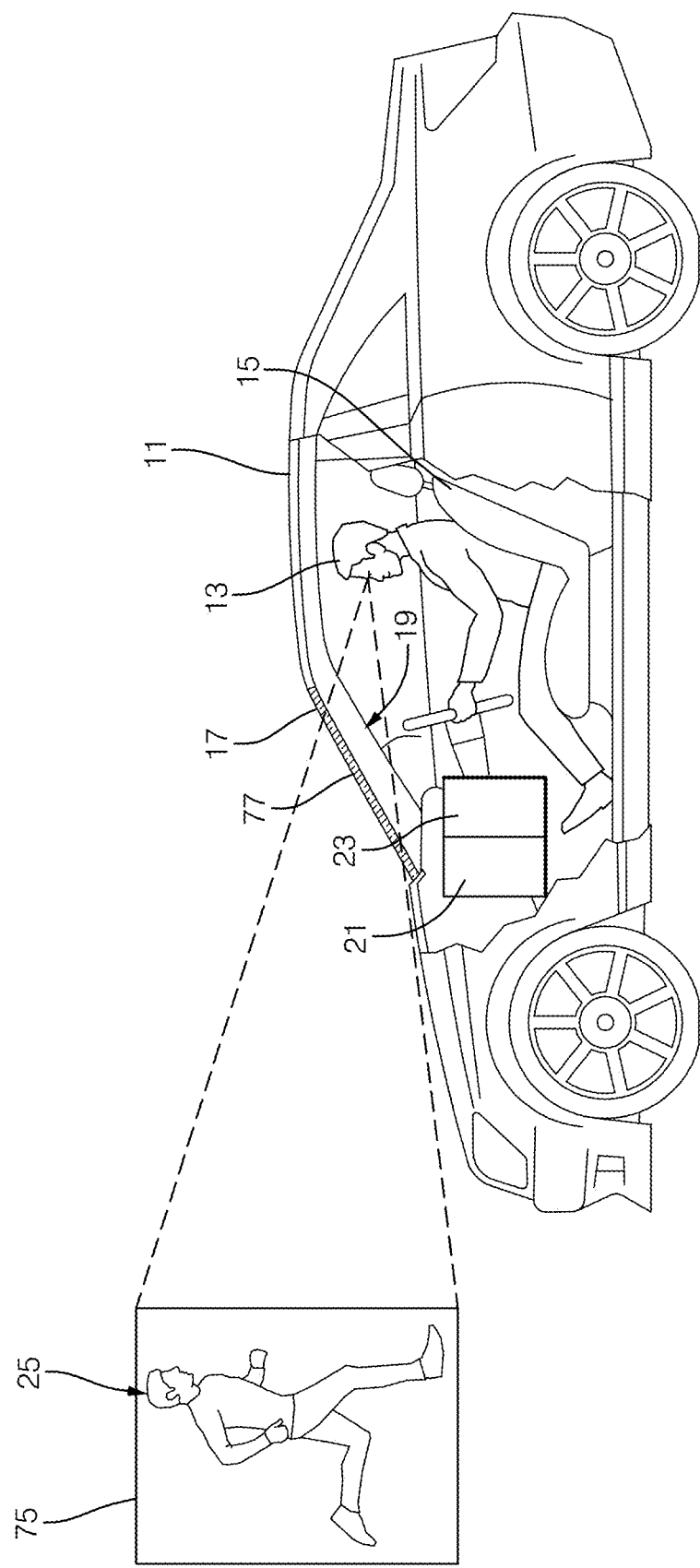

As shown in FIG. 3, the visual output related to the external object 25, i.e. a pedestrian in the environment of the vehicle, is a frame 75 for highlighting the object 25 or the pedestrian within the field of view of the driver 13 within the vehicle 11. That is, the visual output is actually displayed within a display location 77 on the windshield 17 as a part of the head-up display 19.

The frame 75 is just one example for visual output related to an external object 25 which may be displayed as spatial information on the head-up display 19. Further examples are highlighting information for road bumps like potholes in front a vehicle and highlighting a lane to be taken based on information from a navigation system of the vehicle 11. Furthermore, meta information may be displayed on the head-up display 19 which is related to static objects in the environment of the vehicle 11, e.g. shops or other facilities. The meta information may comprise opening hours or advertisements of the respective shop or facility.

Due to the FRAC controller 69 (see FIG. 2), the visual output like the frame 75 for highlighting the pedestrian as external object 25 (see FIG. 3) is stabilized and further shown at the correct location on the windshield 17 even if imminent or instantaneous disturbance events occur which influence the movement of the vehicle. Therefore, an undesired jitter of the visual output is reduced or avoided by using the system as shown in FIG. 2.

What is claimed is:

1. A computer implemented method for providing information related to an external object in a field of view of a driver of a vehicle, the method comprising:
    monitoring the driver by a camera system within the vehicle;
    identifying, by a driver modeling module based on a neural network using data provided by the camera system, an estimated eye position of the driver with respect to a vehicle coordinate system;
    validating, by the driver modeling module and based on a rate of change of a relative movement between the estimated eye position and body of the driver, a validated estimated eye position of the driver;
    gathering spatial information of at least one external object being located outside the vehicle by means of an object detection module;
    determining a basic display location for a visual output related to the external object based on the spatial information by using the object detection module;
    detecting at least one imminent or instantaneous disturbance event regarding movement of the vehicle by means of a correction module;
    determining, by using the correction module, an eye position correction based on the validated estimated eye position or a display location correction based on the basic display location in response to the imminent or instantaneous disturbance event in order to compensate an unintended movement of the vehicle; and
    generating the visual output related to the external object based on the validated estimated eye position and the basic display location and based on the eye position correction or the display location correction by means of a display module.

2. The method according to claim 1, wherein the at least one imminent or instantaneous disturbance event is detected by measuring vibrations or jerks of the vehicle via a gyro sensor and an accelerometer.

3. The method according to claim 1, wherein:
    the at least one imminent or instantaneous disturbance event is detected by the correction module by:
    monitoring a road in front of the vehicle;
    estimating a ground level based on data provided by monitoring the road; and
    determining a deviation from the estimated ground level for the road in front of the vehicle.

4. The method according to claim 1, wherein
    identifying the estimated eye position of the driver by using the correction module further comprises:

determining a face spatial location and a body spatial location of the driver with respect to the vehicle coordinate system based on data provided by the camera system; and determining or validating the estimated eye position based on the face spatial location and the body spatial location.

5. The method according to claim 4, wherein identifying the estimated eye position of the driver further comprises predicting the estimated eye position based on the face spatial location and the body spatial location for a predetermined time period.

6. The method according to claim 1, wherein gathering the spatial information of the external object comprises the object detection module extracting data from three-dimensional maps provided by a navigation system of the vehicle.

7. The method according to claim 1, wherein validating the estimated eye position further comprises:
comparing the rate of change of the relative movement between the estimated eye position and body of the driver to defined upper limits for the rate of change.

8. A system for providing information related to an external object in a field of view of a driver of a vehicle, the system comprising:
a camera system configured to monitor a driver within the vehicle;
a driver modeling module based on a neural network using data provided by the camera system and configured to:
identify an estimated eye position of the driver with respect to a vehicle coordinate system; and
validate, based on a rate of change of a relative movement between the estimated eye position and body of the driver, a validated estimated eye position of the driver;
an object detection module configured to gather spatial information of at least one external object being located outside the vehicle and to determine a basic display location for a visual output related to the external object based on the spatial information;
a correction module configured to:
i) detect at least one imminent or instantaneous disturbance event regarding movement of the vehicle, and
ii) determine an eye position correction based on at least one of the validated estimated eye position or a display location correction based on the basic display location in response to the imminent or instantaneous disturbance event in order to compensate an unintended movement of the vehicle; and
a display module configured to generate the visual output related to the external object based on the validated estimated eye position and the basic display location and based on the at least one of the eye position correction or the display location correction.

9. The system according to claim 8, wherein the camera system comprises at least one of:
a time of flight camera;
a near infrared camera; or
a stereo camera.

10. The system according to claim 8, wherein the correction module comprises a gyro sensor and an accelerometer for measuring vibrations or jerks of the vehicle as instantaneous disturbance events regarding movement of the vehicle.

11. The system according to claim 8, wherein:
the correction module comprises a ground level estimation module configured to monitor a road in front of the vehicle and estimating a ground level based on data provided by monitoring the road; and
the correction module is configured to determine an imminent disturbance event regarding movement of the vehicle by determining a deviation from the estimated ground level for the road in front of the vehicle.

12. The system according to claim 11, wherein the ground level estimation module comprises a stereo camera system or a LIDAR system for monitoring the road in front of the vehicle.

13. The system according to claim 8, wherein the driver modeling module further comprises:
a face detector for determining a face spatial location of the driver with respect to the vehicle coordinate system based on data provided by the camera system;
a body detector for determining a body spatial location of the driver with respect to a vehicle coordinate system based on data provided by the camera system;
an eye tracker for determining and tracking the estimated eye position based on the face spatial location; and
a validation unit for validating the estimated eye position based on the body spatial location.

14. The system according to claim 8, wherein the object detection module comprises at least one component of an advanced driver assistance system of the vehicle configured to identify the spatial information of the external object.

15. A computer system, the computer system being configured to:
monitor a driver by a camera system within a vehicle;
identify, by executing a driver modeling module based on a neural network using data provided by the camera system, a validated estimated eye position of the driver, with respect to a vehicle coordinate system, and validated based on a rate of change of a relative movement between an estimated eye position and body of the driver;
gather spatial information of at least one external object being located outside the vehicle by means of an object detection module;
determine a basic display location for a visual output related to the external object based on the spatial information by using the object detection module;
detect at least one imminent or instantaneous disturbance event regarding movement of the vehicle by means of a correction module;
determine, by using the correction module, an eye position correction based on the validated estimated eye position or a display location correction based on the basic display location in response to the imminent or instantaneous disturbance event in order to compensate an unintended movement of the vehicle; and
generate the visual output related to the external object based on the validated estimated eye position and the basic display location and based on the eye position correction or the display location correction by means of a display module.

16. The computer system according to claim 15, wherein the at least one imminent or instantaneous disturbance event is detected by measuring vibrations or jerks of the vehicle via a gyro sensor and an accelerometer.

17. The computer system according to claim 15, wherein:
the at least one imminent or instantaneous disturbance event is detected by the correction module by:
monitoring a road in front of the vehicle;
estimating a ground level based on data provided by monitoring the road; and determining a deviation from the estimated ground level for the road in front of the vehicle.

18. The computer system according to claim 15, wherein the computer system is configured to:
identify the validated estimated eye position of the driver by using the correction module further comprises:
determine a face spatial location and a body spatial location of the driver with respect to the vehicle coordinate system based on data provided by the camera system; and
determine the validated estimated eye position based on the face spatial location and the body spatial location.

19. The computer system according to claim 18, wherein the computer system is configured to identify the validated estimated eye position of the driver further comprises predicting the validated estimated eye position based on the face spatial location and the body spatial location for a predetermined time period.

20. A non-transitory computer readable medium comprising instructions that when executed, configure a computing system to:
monitor a driver by a camera system within a vehicle;
identify, by executing a driver modeling module based on a neural network using data provided by the camera system, a validated estimated eye position of the driver, with respect to a vehicle coordinate system, and validated based on a rate of change of a relative movement between an estimated eye position and body of the driver;
gather spatial information of at least one external object being located outside the vehicle by means of an object detection module;
determine a basic display location for a visual output related to the external object based on the spatial information by using the object detection module;
detect at least one imminent or instantaneous disturbance event regarding movement of the vehicle by means of a correction module;
determine, by using the correction module, an eye position correction based on the validated estimated eye position or a display location correction based on the basic display location in response to the imminent or instantaneous disturbance event in order to compensate an unintended movement of the vehicle; and
generate the visual output related to the external object based on the validated estimated eye position and the basic display location and based on the eye position correction or the display location correction by means of a display module.

* * * * *